A. SCHMID.
MEANS FOR SELECTIVELY OPERATING APPARATUS.
APPLICATION FILED MAR. 4, 1912.

1,200,885.

Patented Oct. 10, 1916.
8 SHEETS—SHEET 1.

Witnesses:

Inventor:
Arnold Schmid.

A. SCHMID.
MEANS FOR SELECTIVELY OPERATING APPARATUS.
APPLICATION FILED MAR. 4, 1912.

1,200,885.

Patented Oct. 10, 1916.
8 SHEETS—SHEET 2.

Witnesses:

Inventor:
Arnold Schmid
By Henry Orth
Atty

A. SCHMID.
MEANS FOR SELECTIVELY OPERATING APPARATUS.
APPLICATION FILED MAR. 4, 1912.

1,200,885.

Patented Oct. 10, 1916.
8 SHEETS—SHEET 3.

Witnesses:
Inventor:
Arnold Schmid

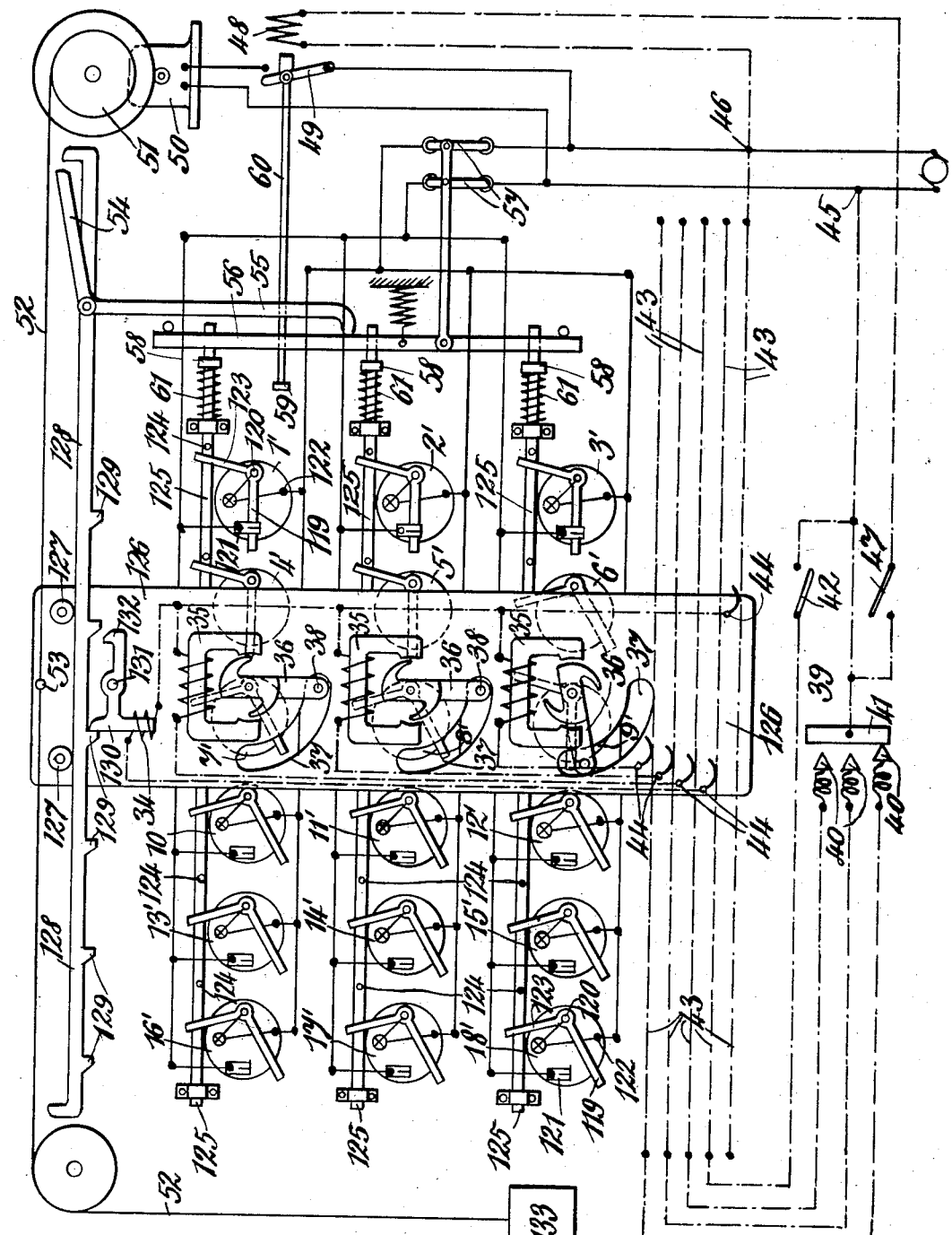

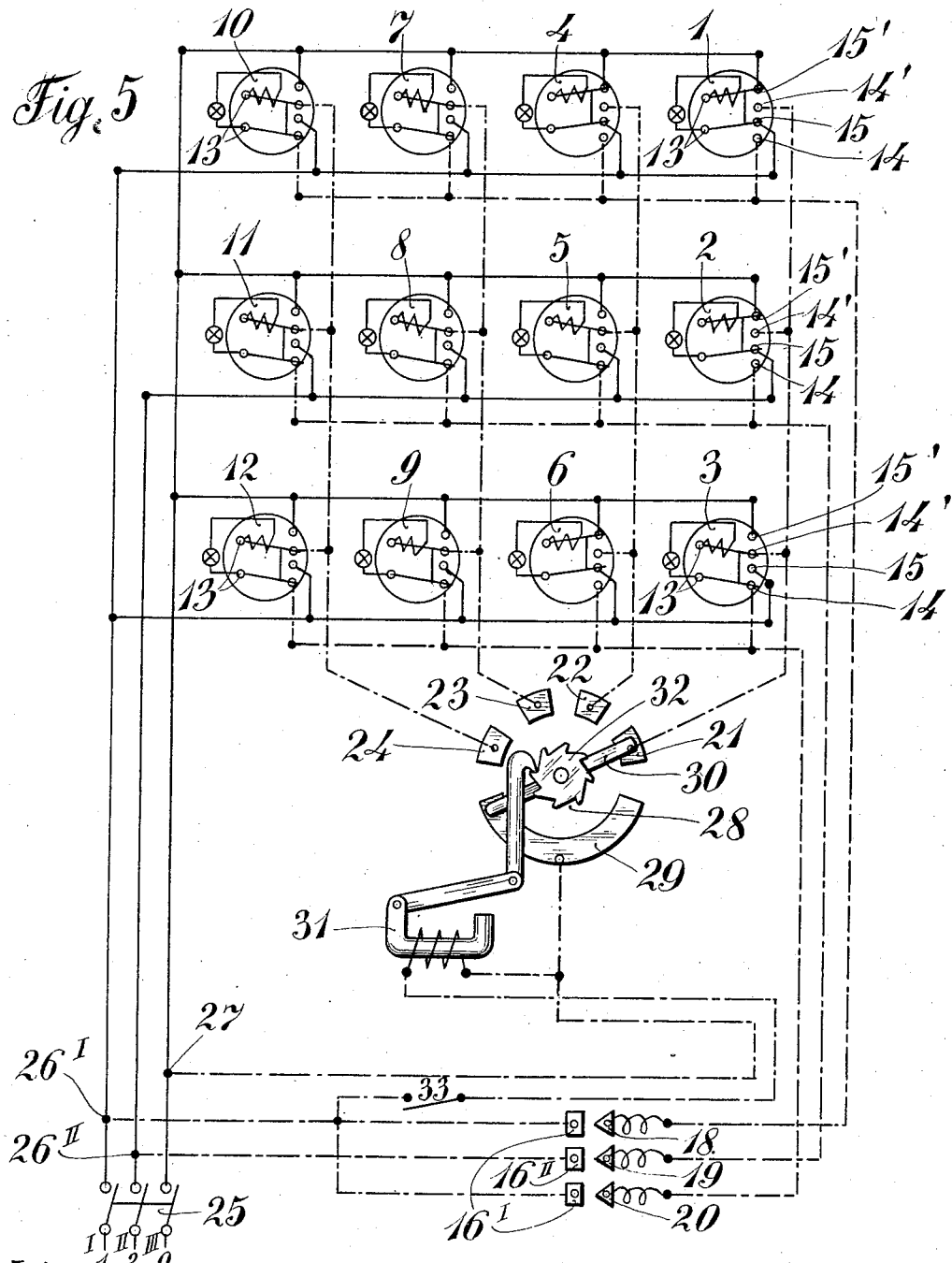

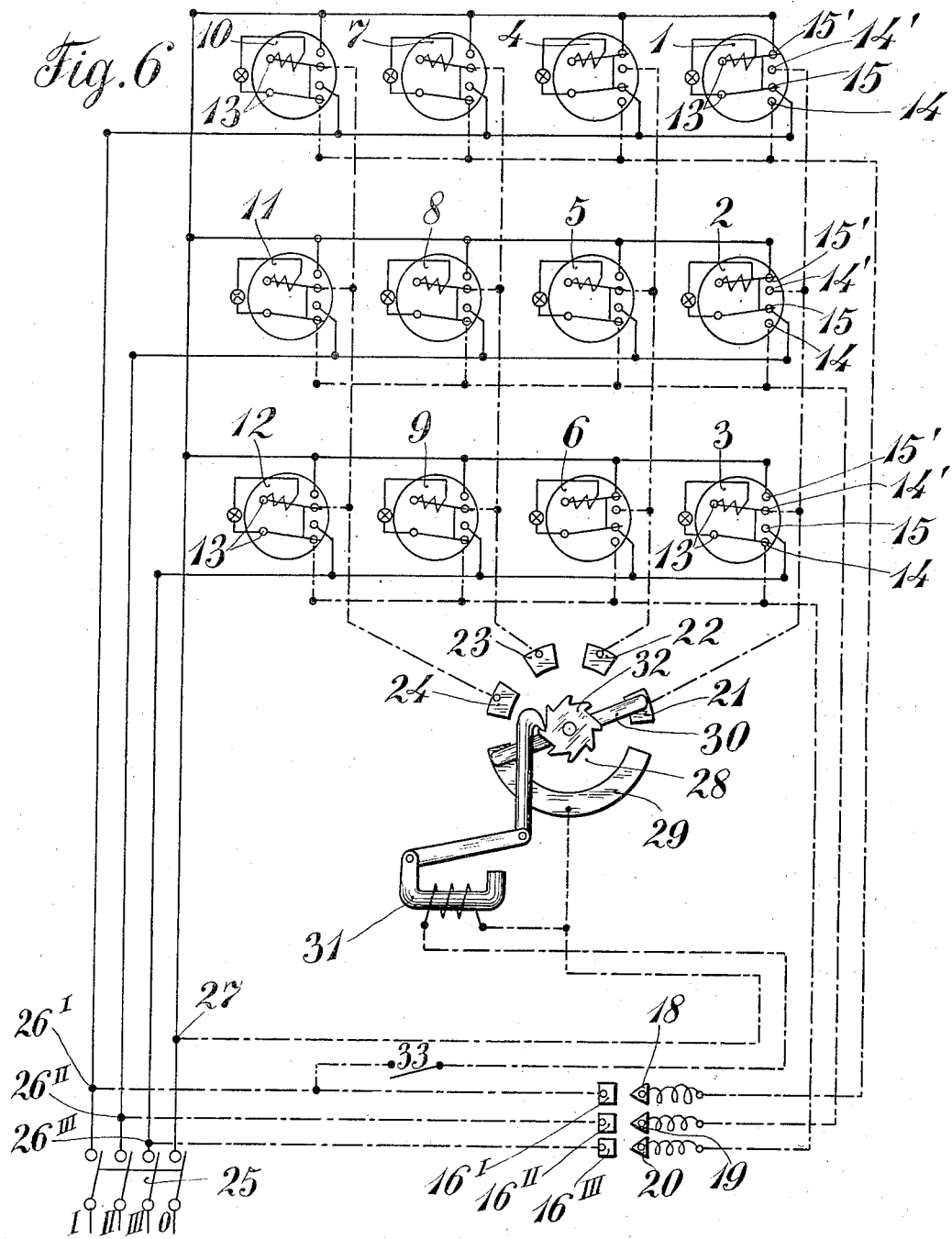

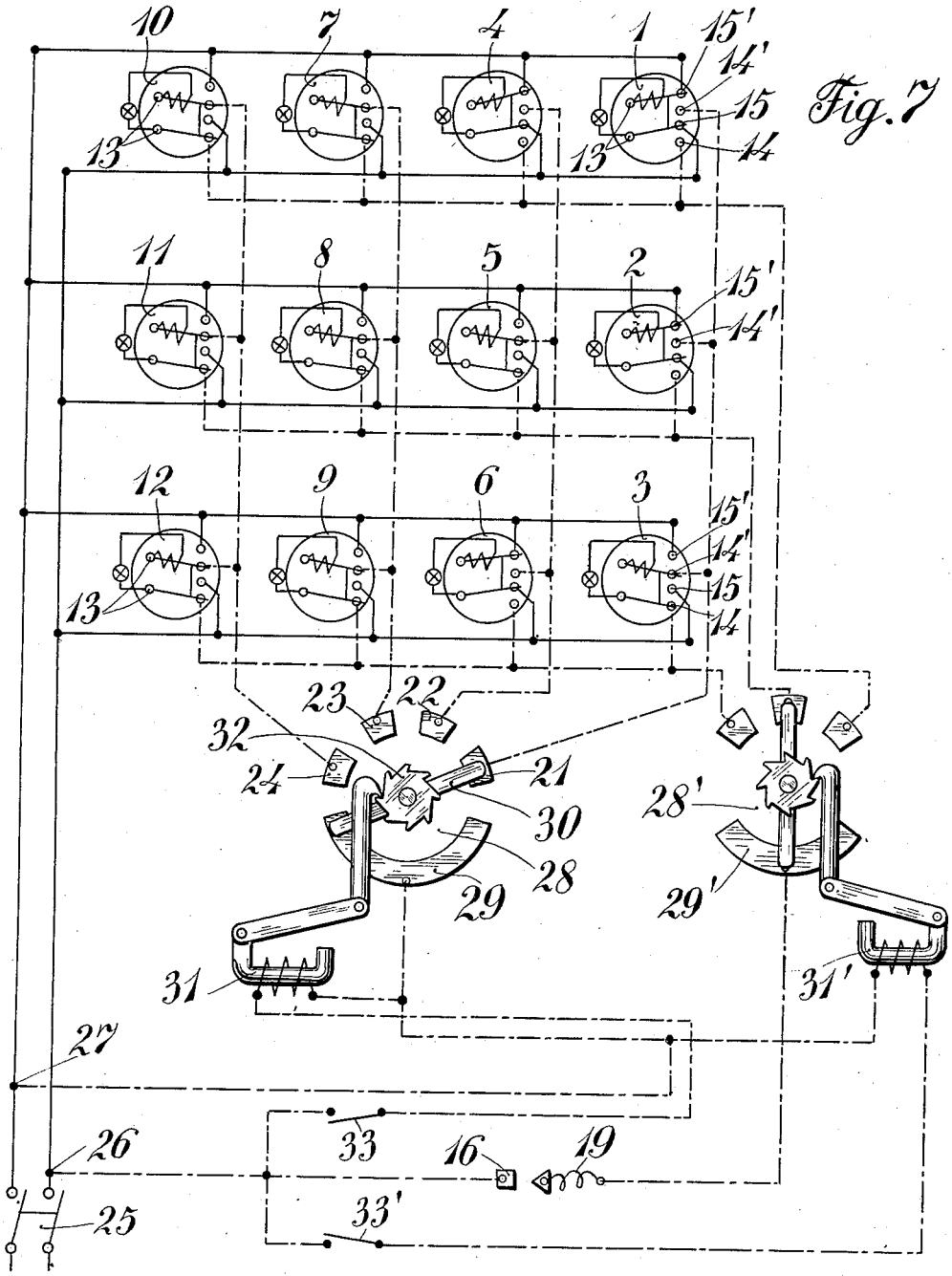

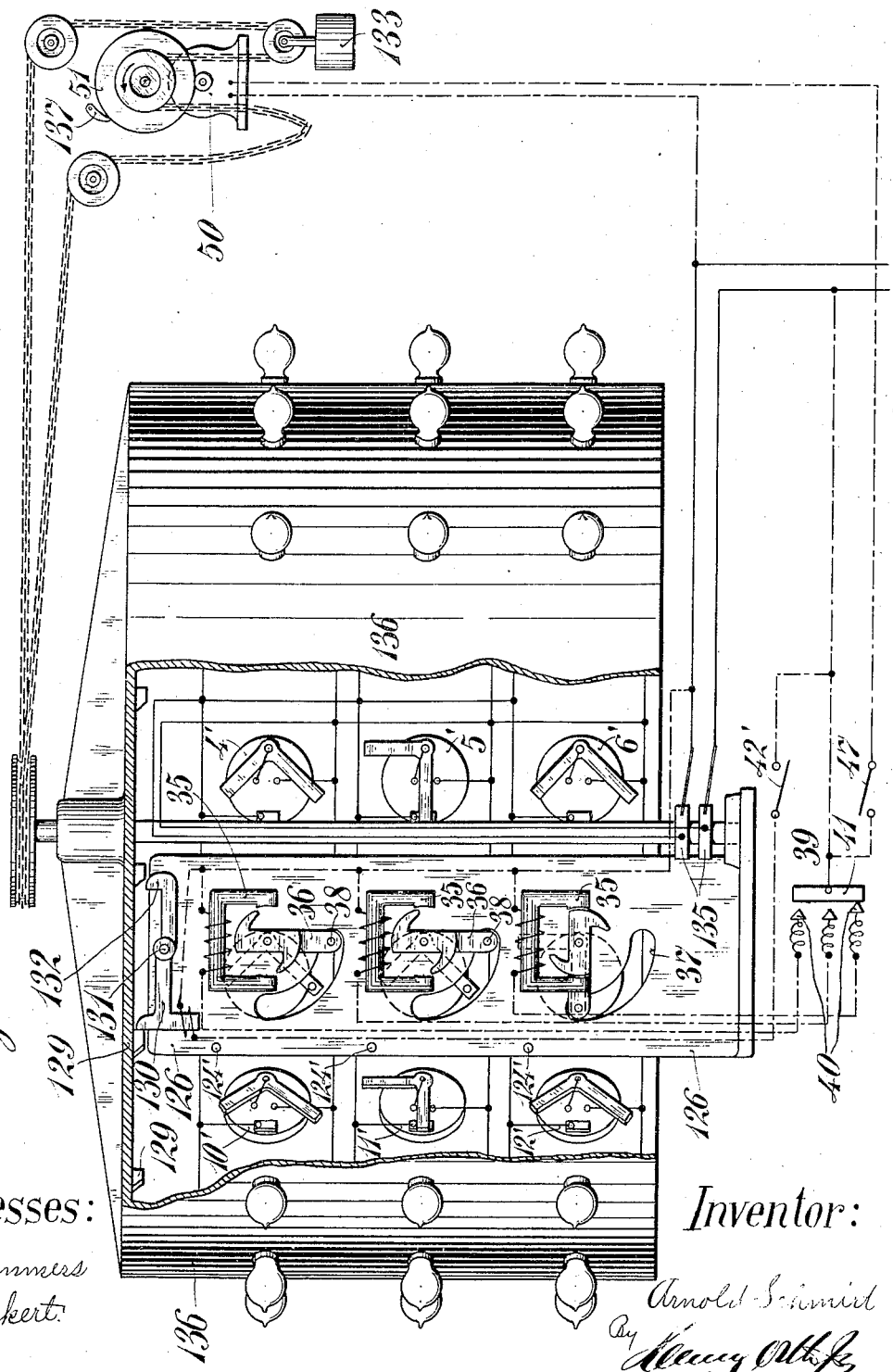

UNITED STATES PATENT OFFICE.

ARNOLD SCHMID, OF SCHAFFHAUSEN, SWITZERLAND.

MEANS FOR SELECTIVELY OPERATING APPARATUS.

1,200,885.     Specification of Letters Patent.     Patented Oct. 10, 1916.

Application filed March 4, 1912. Serial No. 681,555.

*To all whom it may concern:*

Be it known that I, ARNOLD SCHMID, a citizen of the Republic of Switzerland, residing at Schönau 7, Schaffhausen, Switzerland, have invented certain new and useful Improvements in Means for Selectively Operating Apparatus, of which the following is a specification.

My invention relates to means for selectively operating one or several of a plurality of systematically arranged apparatus, as incandescent lamps, motors for instance such for impelling sirens for signal purposes, electric horns, heating apparatus and the like.

My invention is especially adapted to be employed in advertisement by light. Electric means of the type referred to have previously been proposed in which the selection of incandescent lamps is performed by means of relays provided for each lamp which relays often are divided in groups by different pre-selector relays and connected to a central contact making apparatus by means of a large number of wires. The large number of relays and wires complicate much the whole system so that the security of service is decreased.

The object of my invention is to diminish the number of connecting wires between the apparatus to be operated and the contact making apparatus at the central station so that if necessary the central station can be arranged at a distance from the apparatus to be switched without increasing too much the costs of installation.

A further object of my invention is to diminish as much as possible the number of the operating relays which hereinafter shall be referred to as change over relays. The security of service and the simplicity of the whole arrangement are much increased hereby. Instead of operating each apparatus by a single relay, as in the well known systems, it is possible according to my invention to select the apparatus to be operated by means of a relatively very small number of relays hereinafter referred to as switching relays, in suitable connection with mechanical devices.

In the specification several illustrative embodiments of my invention are described and illustrated in the accompanying drawings.

Figure 1:
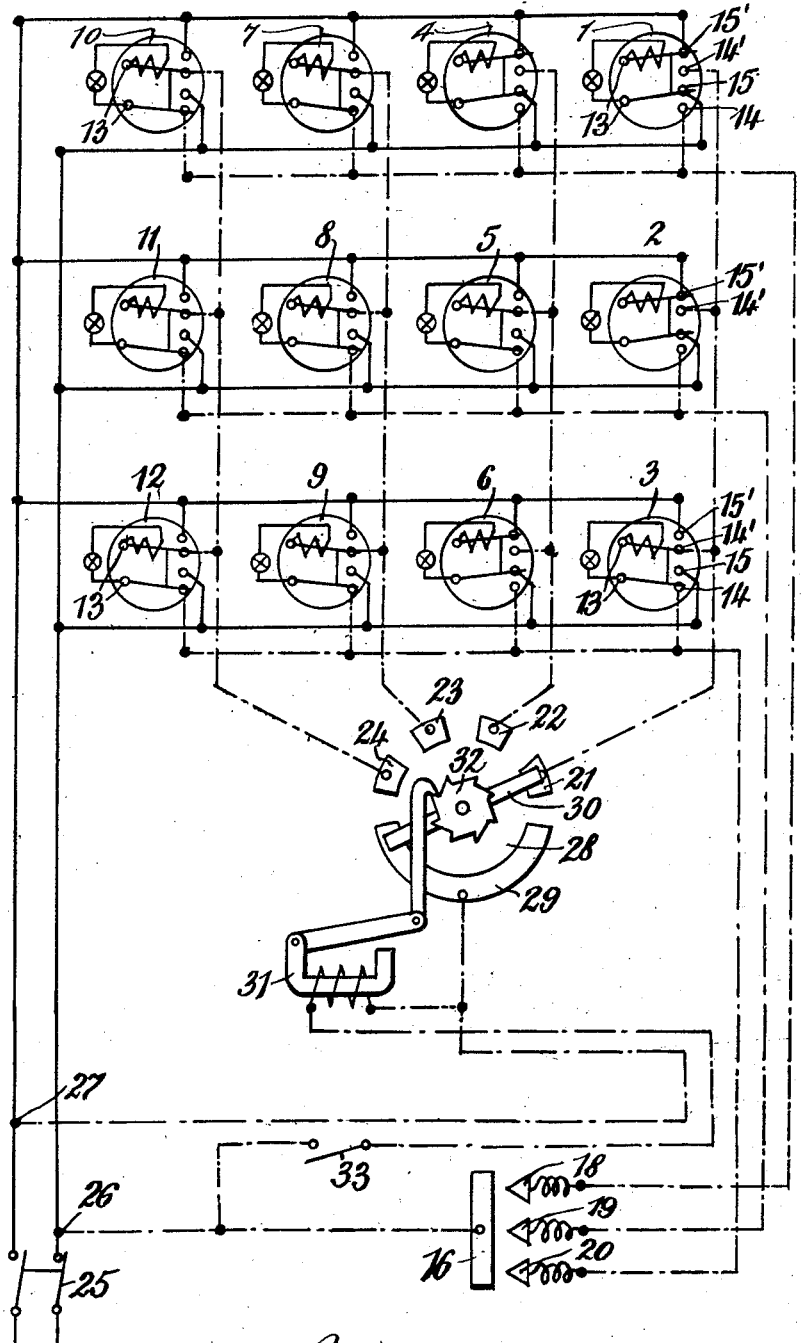
Figure 2:
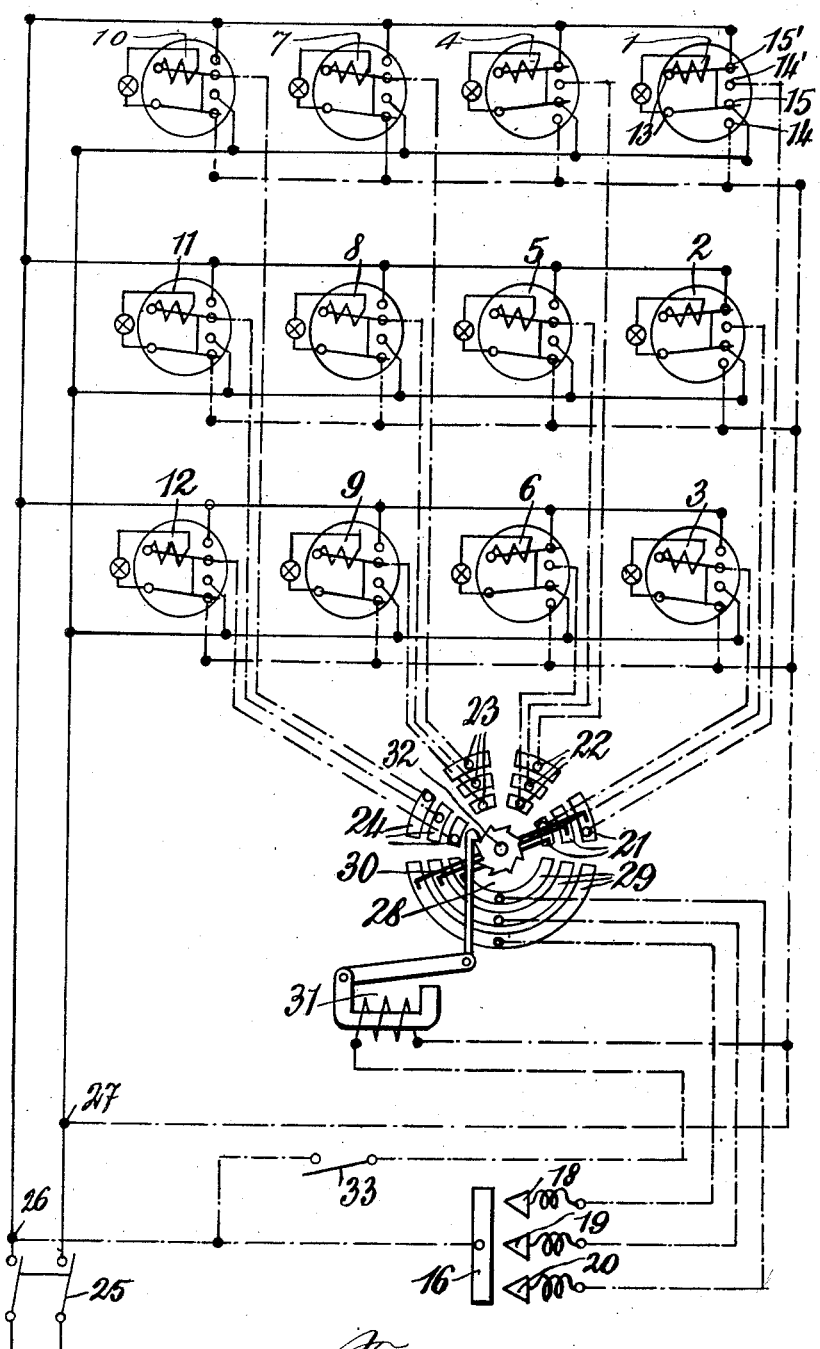
Figure 3:
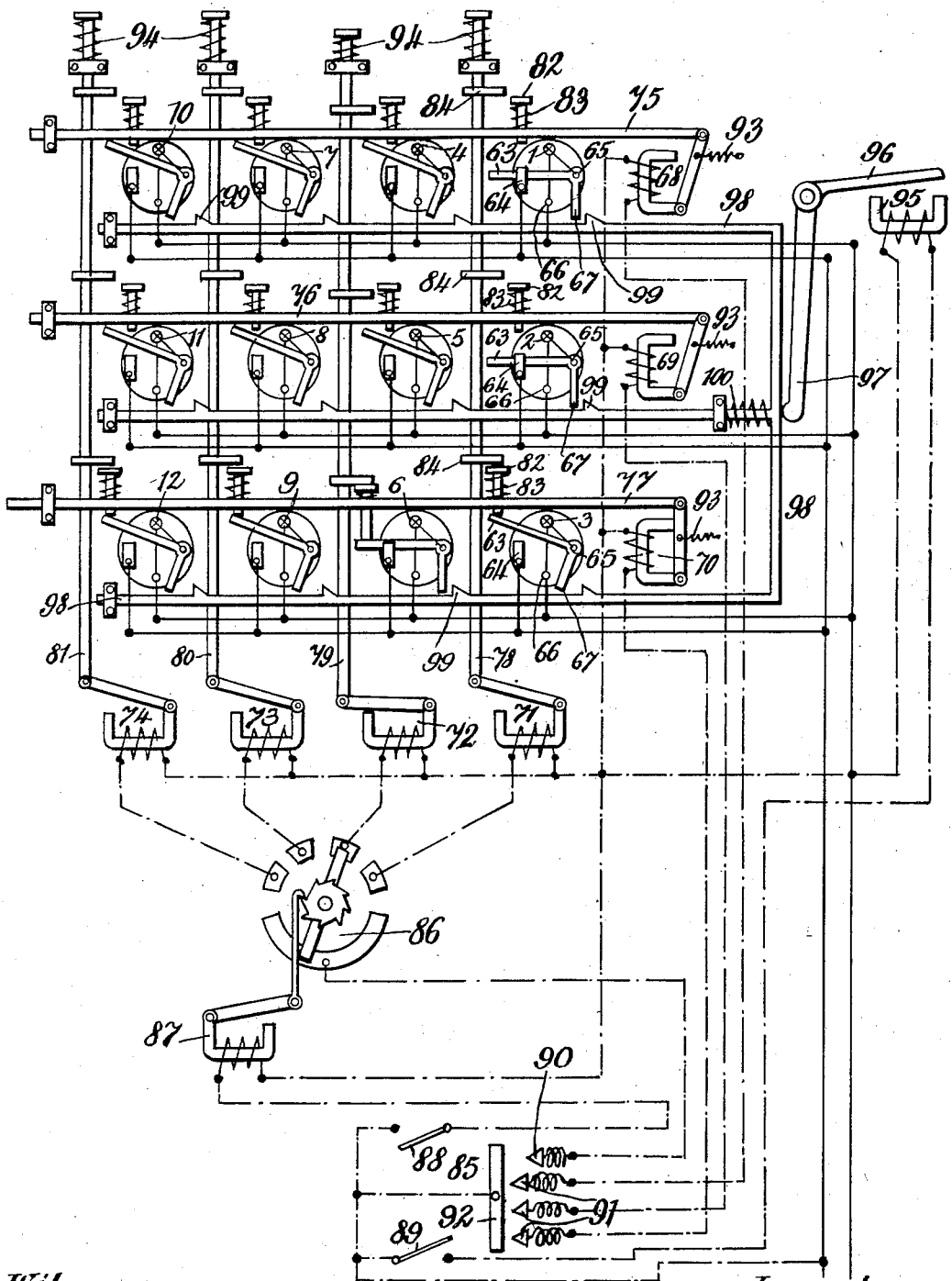

Figure 1 is a diagrammatic view embodying my invention. Fig. 2 illustrates another form of construction embodying my invention; Fig. 3 illustrates another form of construction. Fig. 4 illustrates an arrangement having a traveling carriage. Fig. 5 illustrates the structure illustrated in Fig. 1 as connected to a three-wire system, either a three-wire direct current, or a three-wire single phase, or a two-phase three-wire, or a three phase system of electric distribution. Fig. 6 shows the same connected to a four-wire two-phase alternating current system, or to a three-phase alternating current system having a neutral wire. Fig. 7 is a modification of Fig. 1. Fig. 8 is a modification of Fig. 4.

The apparatus to be operated are hereinafter described as incandescent lamps. But as stated above the lamps may be replaced by any other electric apparatus consuming electric energy.

The auxiliary connections are represented in the drawings by dot and dash-lines and the main circuits by full lines. For the sake of clearness the main circuits are shown in all figures as two wire systems. Since all apparatus are connected in multiple any desired distribution system may be used, as for example a three-wire direct current or single-phase, a two-phase three-wire or four-wire system and a three-phase system with or without neutral wire. When simultaneously using several phases in the first three described examples the contact making devices must be divided according to the number of phases as shown in Figs. 5 and 6, but other complications are not necessary. In all figures the auxiliary circuits are connected to the main circuits.

The first illustrative embodiment is shown in Fig. 1 by way of example. The system comprises twelve lamps in connection with the contact making device. Each lamp is provided with a double throw double pole switch mounted on the back of its base, which switch is operated by a relay. These change over relays 1 to 12 are diagrammatically shown on the drawing. The lamps are connected to the pivots 13 of the switches. On the drawing all change over relays are shown in series with the corresponding lamps. The four terminals 14, 14' and 15, 15' of each change over relay are connected by twos to an auxiliary circuit (—.—.—.—.—) and to a main circuit (———).
The vertical auxiliary wires connected to the terminals 14' lead to the contact pieces 21, 22, 23 and 24 of a distributer 28. A single return line leads from the contact 29 of the distributer 28 to the connection 27. According to the position of the contact brush 30, which is operated by means of a relay 31 and a ratchet wheel 32, any of the four vertical auxiliary wires can be connected to the return wire. The current for actuating the relay 31 is opened and closed by means of a switch 33 on the contact making device. The contact making device arranged in the central station comprises the contacts 16, 18, 19, 20 and 33.

The working of the system is as follows: If for instance the change over relay 2 is to be actuated by repeated closing and opening the switch 33, the relay 31 is repeatedly excited until the contact brush 30 connects the contact piece 21 to the segment 29. When thereafter the contact 19 is pressed against the plate 16 so that a circuit is closed comprising the connection 26, the plate 16, the contact 19, the terminal 14, the lamp, the coil and terminal 14' of relay 2, the contact piece 21, the contact brush 30, the segment 29 and the connection 27. The change over relay 2 changes its lamp and coil at once over to the main circuit so that they become independent from the auxiliary circuit. If a second lamp is to be lighted for instance in the second vertical row the relay 31 is excited by closing the switch 33 only once, which relay by its armature rotates the wheel 32 one tooth so that the brush 30 makes contact with the piece 22. The contacts 18 to 20 corresponding to the change over relay is pressed against the plate 16 whereafter a similar circuit is closed as described above. In order to extinguish the lamps the current is interrupted by means of the main switch 25 so that all coils are without current and the apparatus are changed over to the auxiliary circuit. After cutting in the switch 25 again the system is ready for service. By suitably selecting the lamps of which any desired number may be provided any desired picture or letters or whole sentences may be composed.

If very large lamp boards, especially such of almost quadrangular shape are used and if the lamp boards are arranged at large distances from the central contact making device it will be advisable not only to lead the vertical auxiliary wires to a distributer as shown in Fig. 1, but also to insert a distributer between the horizontal auxiliary wires and the contact making device, as shown in Fig. 7. The number of connections is hereby again decreased, whereby the costs of a long line are greatly diminished. The three leads shown in Fig. 1 conducting to the contacts 18 to 20 are replaced in this case by a single lead and a corresponding contact 19 which may be pressed against the plate 16. A switch 33' similar to the switch 33 is provided for actuating the second distributer 28'. A single wire leads to a relay 31' for the operating of the second distributer switch 28' and back to the connection 27. This distributer 28' has four contacts. A single line leads from the contact 29' of the distributer 28' to the contact 19, controlling said distributer. The three other contacts of the distributer 28' are connected to the terminals 14 of the lamps of the horizontal rows, one contact only belonging to a single horizontal row. The operation of the second distributer is exactly the same as that of the first distributer 28, already described.

A third illustrative embodiment is shown in Fig. 2. The arrangement of the relays with the lamps and the construction of the central contact making device is the same as in Fig. 1. The connections between the lamp board, the distributer and the contact making device and the construction of the distributer is changed. While according to Fig. 1 only one contact 21 to 24 is provided for each vertical row of lamps, in the example shown in Fig. 2 a contact is provided for each lamp, so that there is provided a contact group 21 to 24 for each vertical row of lamps. Each group comprises the same number of contacts as the number of lamps in a vertical row, that means three contacts in the example illustrated. The contact brush 30 therefore is composed of three insulated bars which make contact with three segments 29. The segments 29 are connected to the contacts 18 to 20.

The terminals 14' of the relays 1 to 12 are connected with the corresponding groups of contacts 21 to 24 of the distributer 28 as shown in Fig. 2, while all terminals 14 are connected to a common return line which is fed from the connection 27. The switching motion of the distributer 28 is the same as in the first described example. The operation when selectively cutting in one of the relays 1 to 12 is also similar as described in the first example, so that it is not necessary to describe the operation again.

In the last described arrangement unadjusted relays can be used, while in the first described arrangements the relays must always be adjusted according to the voltage of the system. If in Fig. 1 for example the relay 6 is cut in the relays 5, 8 and 9 are also traversed by current as long as the contact arms of relay 6 are connected with terminals 14 and 14', because at this time the coils of these relays are connected in series to the terminals 14 and 14' of relay 6. The tension between the terminals of these relays is equal to one third of the tension of the circuit. The relays used in the first described arrangements must therefore be constructed so that they do not act at tensions which are much different from the tension of the system. This condition is avoided in the last described arrangement.

In the fourth illustrative embodiment which is shown by way of example in Fig. 3 it is not necessary to provide a change over relay for each incandescent lamp. The number of change over relays is reduced to the algebraic sum of all rows of lamps. In the example illustrated in which 4 vertical and 3 horizontal rows are provided, there are 7 relays necessary therefore. Each of these relays 68 to 74 displaces by attracting an armature a rod disposed along the corresponding row of lamps. The horizontal rods 75 to 77 carry movable pins 82 disposed at distances apart which are equal to the horizontal distances of the lamps. The pins are pressed upward by springs 83. The vertical rods 78 to 81 are provided with projections 84 corresponding to each lamp. The pins 82 of the rods 75 to 77 are located so that when an armature of one of the relays 68 to 70 is attracted the pins 82 of the corresponding rod 75 to 77 are situated exactly below the projections 84 of the rods 78 to 81. When thereafter one of the relays 71 to 74 attracts its armature the projections 84 of the corresponding rod 78 to 81 moves the before displaced corresponding pin 82 downward so that the pin pushes by its lower end against the switch 63. The switch is caused thereby to make contact with the springs 64. Thus a current flows from the main circuit over the contact springs 64, the switch 63, the pivot 65 to the corresponding lamp and from the terminal 66 back to the main circuit.

The connections between the lamp-board and the contact making device 85 may be constructed so that there is provided a wire for each relay and a common return wire. The construction is simplified by arranging a distributer 86 on the lamp board in the same manner as in the second described illustrative embodiment. The working of the distributer is the same as described above.

The cutting in of any lamp is as follows: By means of the switch 88 and the switching relay 87 the distributer 86 is switched in the desired position as described above. Then for example the lowest of the three contacts 91 is pressed against the plate 92, whereafter the relay 70 attracts its armature and displaces the rod 77 with the corresponding pins 82 toward the left. The pins 82 become situated thereby below the lowest projections of the rods 78 to 81. By pressing thereafter the contact 90 three times against the plate 92, in the position of distributer shown in Fig. 3 the relay 72 attracts its armature and moves thereby the vertical rod 79 downward. The lowest projection 84 of this rod presses hereby the corresponding pin 82 of the rod 77 downward, which pin by its lower end presses the lever switch 63 between the springs 64. Hereby a current flows from the main circuit to the lamp 6 passing the contact spring 64, the lever 63, the pivot 65, the lamp and its terminal 66. After removing the contacts 90 and 91 from the plate 92 the rods 77 and 79 are moved back to their initial positions by means of the springs 93 and 94 without opening the switch 63. In order to insert other lamps in circuit the described operation is repeated. If the lamps are to be extinguished again the relay 95 is excited by closing the switch 89 which attracts its armature 96. The armature fixedly carries a lever 97 which by its lower end presses the bracket 98 toward the left. The projections 99 of the bracket are moved against arms 67 secured to the switches 63 whereby all switches are moved in the position of rest that means switching-off position. After opening the switch 89 the relay 95 releases its armature 96 so that the bracket is moved in its position of rest by means of the spring 100. The device is ready hereafter to be operated again.

In the fifth illustrative embodiment which is shown by way of example in Fig. 4 the number of relays is reduced again. For instance for a lamp board comprising 3 horizontal and 6 vertical rows as shown in the drawing there are necessary only three operating relays. 1' to 18' (Fig. 4) designate the eighteen lamps. Each lamp is provided with a single pole lever switch 119 mounted on the back of its base. The lower arm of each switch is adapted to connect the pivot 120 to the contact spring 121. The incandescent lamp is inserted between the pivot 120 and the terminal 122. The upper arm 123 of each switch 119 is mounted to be engaged by the corresponding pin 124 on the rods 125, which pins by moving toward the left move all closed switches into switching-off position.

The three operating relays 35 are mounted in a carriage 126 which is mounted on rollers 127 to move on the rail 128. The rail is provided with several stops 129 which always correspond with a vertical row of lamps. The projection 130 of the stopping device 131 is mounted to engage one of the stops 129 whereby the carriage is prevented from being moved toward the left by the action of the weight 133. When the relay coil 34 of the stopping device is traversed by a current the projection 130 is attracted so that the carriage 126 moves by the action of the weight 133 toward the left until the raised hook 132 moves against one of the stops 129. The hook thus prevents the carriage from moving forward more than one row of lamps also if the current should be closed for a long time. When the relay coil becomes currentless again, the stopping device 131 moves back in its position of rest and leans by its projection 130 against the next stop 129. The stops 129 are located on the rail 128 so that in the position of rest of the carriage the axes of rotation of the operating relays 35 exactly correspond with the axes of the pivots 120 of the switches 119. The S-shaped armatures of the relays 35 each carry a lever 36 which is provided with a pin 38 projecting through an arcuate slot 37 of the carriage toward the switches 119. If any one of the operating relays 35 is excited by a current the armature of the relay is turned clockwise. The pin 38 moves against the end of the lever switch 119 so that the switch makes contact with the contact spring 121. When the operating relay 35 becomes currentless again, the lever 36 of the armature moves back in the vertical position, but the lever switch 119 remains closed.

The operating relays 35 are selectively excited from the contact making device 39 by pressing one or several contacts 40 against the contact plate 41. By closing the switch 42 the relay coil 34 is traversed by a current. Strained bare wires 43 and contact brushes 44 may be provided to electrically connect the fixed contact making device 39 to the apparatus on the carriage 126. In Fig. 4 the two upper operating relays are shown to be currentless, while the lowest relay is shown excited. The latter is fed from the connection 45 of the main circuit. The current traverses the contact plate 41, the lowest of the three contacts 40, the topmost of the wires 43, the corresponding brush 44, the coil, the lowest of the wires 43 and flows to the second connection 46 of the main circuit. If the carriage is to be moved an amount equal to the distance of another row of lamps, the switch 42 is closed so that the current traverses from the connection 45 to the switch 42, the second wire 43 from below, the corresponding brush 44, the relay coil 34, the lowest wire 43 to the connection 46. The relay coil 34 is excited thereby and the weight 133 moves the carriage in the above described manner.

When the carriage 126 reaches the end of the row of lamps the switch 47 of the central contact making device is closed and the switch 49 of the motor 50 closed by means of the coil 48. The motor rotates the pulley 51 by means of suitable gears. A rope 52 is secured to the pulley and carries the weight 133. The rope is also fixed at 53 to the carriage 126. The weight 133 is raised by the rotation of the motor and the carriage simultaneously moved toward the right.

Near the right end of the rail 128 the rollers 127 are caused to move against the arm 54 of a double-armed lever. By the weight of the carriage 126 the lever is turned so that its second arm 55 moves a rod 56 toward the left. The main switch 57 is opened thereby so that the main circuit is opened and all lamps are extinguished. In the meantime the rod 56 moves against the disks 58 on the rails 125 and presses them toward the left. The pins 124 move against the levers 123 of the switches 119 which are in switching-on position and move these switches back in the position of rest that means switching-off position. Thereafter the rod 56 moves against the head 59 of the switching rod 60 whereby the switch 49 is opened. The weight 133 preponderates and moves the carriage 126 toward the left until the projection 130 of the stopping device 131 strikes against the first stop 129. During this motion of the carriage 126 the armature of the currentless motor is turned. As soon as the rollers 127 have left the arm 54 the rods 125 are moved by the springs 61 toward the right and the main switch 57 is closed by means of the rod 56. The whole system becomes automatically hereby ready for operating again. The main switch 57 is provided only to save the contacts of the switches 119 and the springs 121. The main switch 57 must be opened therefore before the switches 119 are opened by the rods 125. The main switch if desired can easily be provided with the well-known spark-extinguishing devices. The operation of the system is not changed thereby.

In many cases it is desirable to use a rotating lamp board of cylindrical shape while the carriage 126 is fixed as shown in Fig. 8. The contact wires 43 are omitted in this case but the main wires are to be connected to the rotating board by means of slip rings 135. The operation is the same as described with reference to Fig. 4. By closing switch 42 (Fig. 8) the part 130 of pawl 131 is attracted so that the lamp board 136 moves under the influence of weight 133 until the pawl 131 again engages a stop 129. By selectively operating one or more of the contacts 40 on plate 41, one or more of the relays 35 are energized to operate their adjacent switches. If the weight 133 has descended nearly to its limit, the motor 50 is set in operation by closing switch 47 to raise it, until the switch 47 is again opened. The motor and winding drum 51 actuated thereby are prevented from being rotated in a reverse direction by the weight, by a pawl 137 engaging the drum 51.

In order to still more reduce the number of connections between the lamp board and the contact making device these connections may be led to a distributer in the manner as in the first described example which distributer can be operated by only two wires.

The five described examples are adapted to suit very different conditions. When selecting any construction the type of the apparatus to be operated, their number and their arrangement is to be considered.

I claim:

1. In an electric installation for selecting certain apparatus out of a large number of apparatus, a receiving station, said large number of apparatus being arranged at points of intersection of a system consisting of two groups of intersecting lines arranged at said receiving station, a means electrically connected to each apparatus for bringing it into its working condition, means for controlling said aforementioned means, a switch closer at the receiving station, means for moving said switch closer into a position where it may control the means for bringing the selected apparatus of one line of the first group of intersecting lines of said system into their working condition, a single source of electric energy, a sending station having firstly a contact making apparatus for selecting the apparatus of the second group having as many contacts as there are lines belonging to the second group of said system of intersecting lines, and secondly a circuit closer controlling the moving means of the switch closer, a circuit comprising said source of electric energy and said means for moving said switch closer and also comprising said circuit closer, a second circuit comprising said source of electric energy, said contact making apparatus said switch closer and said means for bringing each apparatus into its working position.

2. In an electric installation for selecting certain apparatus out of a large number of apparatus, a receiving station, said large number of apparatus being arranged at points of intersection of a system consisting of two groups of intersecting lines arranged at said receiving station, a switch electrically connected to each of said apparatus, means for actuating said switches, a switch closer at the receiving station able to control at once the actuating means of said switches belonging to the apparatus of a line of the first group, means for moving said switch closer into a position where it may control the means actuating the switches belonging to the apparatus of one line of the first group of said system of intersecting lines, a single source of electric energy, a sending station having a contact making apparatus for selecting the apparatus of a line of the second group having as many contacts as there are lines belonging to the second group of said system of intersecting lines, and a circuit closer controlling the moving means of the switch closer, a circuit comprising said source of electric energy, said switching relay and said circuit closer, and a second circuit comprising said source of electric energy, said contact-making apparatus, said switch closer and said means for actuating said switches of each apparatus and the apparatus connected thereto.

3. In an electric installation for selective operation of certain apparatus of a large number of apparatus, a receiving station, said large number of apparatus being arranged at points of intersection of a system consisting of two groups of intersecting lines arranged at said receiving station, a switch for each of said apparatus arranged in series with the latter, means for actuating said switches, a switch closer at the receiving station able to control at once one, some, or all the actuating means of said switches belonging to the apparatus of a line of the first group, a switching relay for stepping said switch closer forward into a position where it is in connection with the means actuating the switches belonging to the apparatus of one line of the first group of said system of intersecting lines, a single source of electric energy, a main circuit leading from said source of electric energy over said switches to said number of apparatus, a sending station having a contact making apparatus for selecting the apparatus of a line of the second group having as many contacts as there are lines belonging to the second group of said system of intersecting lines, and a circuit closer controlling the switching relay, an auxiliary circuit comprising said source of electric energy, said switching relay and said circuit closer, and a second auxiliary circuit comprising said source of electric energy, said contact making apparatus, said switch closer and said means for actuating said switches of each apparatus.

4. In an electric installation for selective operation of a large number of apparatus, a sending station having a contact making apparatus, a receiving station, said large number of apparatus being arranged at points of intersection, of a system consisting of two groups of intersecting lines arranged at said receiving station, a source of electric energy, a switch closer at the receiving station, a relay on said switch closer for each row of the first group of said system of intersecting lines for actuating said apparatus, means for moving said switch closer relatively to the apparatus into a position where the apparatus of one line of the second group of said system of intersecting lines may be actuated, a circuit closer at the sending station, a circuit connecting said source of electric energy with said means for moving said switch closer and comprising said circuit closer, a second circuit connecting said source of electric energy with said contact making apparatus and comprising said switch closer, said contact making apparatus having as many contacts as there are lines belonging to the first group of said system of intersecting lines to selectively or simultaneously operate the apparatus on a line of the second mentioned group of said system of lines.

5. In an electric installation for selective operation of a large number of apparatus, a sending station having a contact making apparatus, a receiving station, said large number of apparatus being arranged at points of intersection of a system consisting of two groups of intersecting lines arranged at said receiving station, a switch for each of said apparatus in connection with the latter, a source of electric energy, a main circuit leading from said source of electric energy over said switches to said large number of apparatus, a switch closer at the receiving station, a closing relay thereon for each row of the first group of said system of intersecting lines for closing the switches of said apparatus, means for moving said switch closer forward into a position where it may actuate the switches belonging to the apparatus of one line of the second group of said system of intersecting lines, a relay controlling the moving of the switches, a circuit closer at the sending station, an auxiliary circuit connecting said source of electric energy with said relay and comprising said circuit closer, a second auxiliary circuit connecting said source of electric energy with said contact making apparatus and including said switch closer, said contact making apparatus having as many contacts as there are lines belonging to the first group of said system of intersecting lines to selectively or simultaneously operate the switches of the apparatus on a line of the second mentioned group of said system of lines.

6. In an electric installation for selective operation of a large number of apparatus, a sending station having a contact making apparatus, a receiving station, said large number of apparatus being arranged at points of intersection of a system consisting of two groups of intersecting lines arranged at said receiving station, a switch for each of said apparatus in connection with the latter, a source of electric energy, a main circuit leading from said source of electric energy over said switches to said large number of apparatus, a switch closer at the receiving station, a closing relay thereon for each row of the first group of said system of intersecting lines for closing the switches of said apparatus, means for moving said switch closer relatively to the apparatus into a position where it may actuate the switches belonging to the apparatus of a line of the second group of said system of intersecting lines, a relay controlling the moving of said switch closer, a circuit closer at the sending station, an auxiliary circuit connecting said source of electric energy with said relay and comprising said circuit closer, a second auxiliary circuit connecting said source of electric energy with said contact making apparatus and comprising said switch closer, said contact making apparatus having as many contacts as there are lines belonging to the first group of said system of intersecting lines, thus being capable of selectively or simultaneously operating the switches of the apparatus on a line of the second mentioned group of said system of lines.

In testimony whereof I have affixed my signature in presence of two witnesses.

ARNOLD SCHMID.

Witnesses:
 ERNST FISCHER,
 CARL GUBLER.